(12) United States Patent
Zhao et al.

(10) Patent No.: US 12,074,344 B2
(45) Date of Patent: Aug. 27, 2024

(54) SHAPED RECHARGEABLE BATTERY ELECTRONIC INTERCONNECT

(71) Applicant: Medtronic, Inc., Minneapolis, MN (US)

(72) Inventors: Hailiang Zhao, Plymouth, MN (US); David Buendorf, Maple Grove, MN (US); Erik J. Hovland, Minnetonka, MN (US); Vadim A. Yakolev, Brooklyn Park, MN (US)

(73) Assignee: Medtronic, Inc., Minneapolis, MN (US)

(*) Notice: Subject to any disclaimer, the term of this patent is extended or adjusted under 35 U.S.C. 154(b) by 64 days.

(21) Appl. No.: 18/010,499

(22) PCT Filed: Jun. 25, 2021

(86) PCT No.: PCT/US2021/039140
§ 371 (c)(1),
(2) Date: Dec. 15, 2022

(87) PCT Pub. No.: WO2021/263135
PCT Pub. Date: Dec. 30, 2021

(65) Prior Publication Data
US 2023/0253686 A1    Aug. 10, 2023

(51) Int. Cl.
*H01M 50/536* (2021.01)
*H01M 50/534* (2021.01)
*H01M 50/54* (2021.01)

(52) U.S. Cl.
CPC ....... *H01M 50/536* (2021.01); *H01M 50/534* (2021.01); *H01M 50/54* (2021.01)

(58) Field of Classification Search
CPC .. H01M 50/536; H01M 50/534; H01M 50/54; H01M 10/0585
See application file for complete search history.

(56) References Cited

U.S. PATENT DOCUMENTS

| | | | |
|---|---|---|---|
| 5,298,683 | A  | 3/1994  | Taylor |
| 7,539,007 | B2 | 5/2009  | Zhao et al. |
| 7,544,220 | B2 | 6/2009  | Zhao et al. |
| 7,819,700 | B2 | 10/2010 | Kruger et al. |
| 7,819,929 | B2 | 10/2010 | Nanasaka et al. |
| 7,887,946 | B2 | 2/2011  | Yamauchi et al. |
| 8,846,243 | B2 | 9/2014  | Ryu et al. |
| 9,005,802 | B2 | 4/2015  | Humphrys et al. |

(Continued)

FOREIGN PATENT DOCUMENTS

| | | |
|---|---|---|
| EP | 3614461 A1 | 2/2020 |
| WO | WO 2021/263135 A1 | 12/2021 |

OTHER PUBLICATIONS

International Search Report and Written Opinion from PCT Application PCT/US2021/039140, dated Sep. 29, 2021, 13 pgs.

(Continued)

*Primary Examiner* — Stewart A Fraser
(74) *Attorney, Agent, or Firm* — Husch Blackwell LLP

(57) ABSTRACT

Devices and methods disclosed herein relate to forming superior mechanical and electrical connections between stacks of foils such as those used in electrochemical cells. The connections described herein use multiple weld types and choice of materials to promote electrical and mechanical connectivity using separate weld types.

20 Claims, 6 Drawing Sheets

(56) References Cited

U.S. PATENT DOCUMENTS

| | | | |
|---|---|---|---|
| 9,147,875 B1 | 9/2015 | Coakley et al. | |
| 9,246,154 B2* | 1/2016 | Ryu | H01M 50/121 |
| 2006/0108335 A1 | 5/2006 | Zhao et al. | |
| 2009/0246617 A1 | 10/2009 | Howard et al. | |
| 2012/0282519 A1 | 11/2012 | Freitag et al. | |
| 2013/0011717 A1* | 1/2013 | Yotsumoto | H01M 50/54 |
| | | | 429/153 |
| 2015/0136840 A1 | 5/2015 | Zhao et al. | |
| 2016/0141583 A1 | 5/2016 | Kim et al. | |
| 2016/0149253 A1* | 5/2016 | Yi | H01M 10/02 |
| | | | 429/127 |
| 2016/0151853 A1 | 6/2016 | Lee et al. | |
| 2017/0033349 A1* | 2/2017 | Dai | H01M 50/191 |
| 2020/0381693 A1* | 12/2020 | Zhao | H01M 50/536 |
| 2022/0359959 A1* | 11/2022 | Zeng | H01M 10/0525 |

OTHER PUBLICATIONS

International Preliminary Report on Patentability from PCT Application PCT/US2021/039140, dated Jul. 13, 2022, 14 pgs.

* cited by examiner

SHAPED RECHARGEABLE BATTERY ELECTRONIC INTERCONNECT

CROSS-REFERENCE TO RELATED APPLICATIONS

The present application is a National Phase entry of PCT Application PCT/US2021/039140 filed Jun. 25, 2021, which claims the benefit of U.S. Provisional Application No. 63/044,326 filed Jun. 25, 2020, the disclosures of which are hereby incorporated by reference in their entirety.

FIELD

The present technology is generally related to methods of welding a stack of metal foil layers together using a penetration weld, and stacks made using such methods. The methods include stacking of the metal foil layers, pressing or compressing the metal foil layers between end plates and welding the end plates and compressed metal foil layer stack together.

BACKGROUND

The disclosure relates to methods of joining thin metal foil layers together to form joined stacks that are electrically conductive, for example, a stack of electrically conductive tabs for electrodes for an electrochemical cell.

Stacked plate electrochemical cells contain layers of metal foils or coated metal foils that are stacked upon one another. Typically, such stacked metal foils have tabs that are joined together at a common location to form an electrical contact point. Welding the stack of metal foil tabs together using penetration or edge welding techniques requires fixturing the individual layers tightly together with no gaps in between any of the layers. If such gaps are present between the layers, welding can cause the individual layer to burn or to not melt completely through to form the interconnect.

Existing stacks of metal foils can suffer from multiple failure modes. For example, one failure mode for stacked metal foils is insufficient electrical connectivity between the foils, or a level of electrical connectivity that decays over time. Additionally, stacks of metal foils can mechanically detach from one another, such as at weld points.

SUMMARY

The present disclosure discloses methods of welding stacks of metal foil layers together. In one embodiment, the method includes stacking a plurality of metal foil layers to form a metal foil layer stack, the metal foil layer stack having a width, a length, and a metal foil layer stack edge, sandwiching the metal foil layer stack between top and bottom end plates, aligning the edges of the top and bottom end plates with the edge of the metal foil layer stack and pressing or compressing the metal foil layers together between the top and bottom end plates and welding the metal foil layer stack and the top and bottom end plates together.

The stacks of metal foil layers can be welded together using multiple types of weld joint designs.

The details of one or more aspects of the disclosure are set forth in the accompanying drawings and the description below. Other features, objects, and advantages of the techniques described in this disclosure will be apparent from the description and drawings, and from the claims.

DETAILED DESCRIPTION

Embodiments herein include electrochemical stacks, welded portions thereof, and methods of forming such stacks. Electrochemical stacks are used in various devices including, but not limited to, implanted medical devices. In the context of an implantable medical device, such as an implantable pulse generators or implantable cardioverter-defibrillators, power from the implanted medical device provides electrical stimulation to tissue of a patient. In order to provide the required power level when electrical stimulation is needed, a battery of the implanted medical device can be used to charge the capacitor, which in turn discharges electrical stimuli to tissue of a patient.

The electrode stack is typically a repeated series of an anode plate, a cathode plate, and an insulating or dielectric separator therebetween. A single tab extends from each anode plate and cathode plate. A set of tabs extending from the anode plates are welded to form the anode whereas tabs from the cathode plates are welded together to form the cathode.

Figure 1:
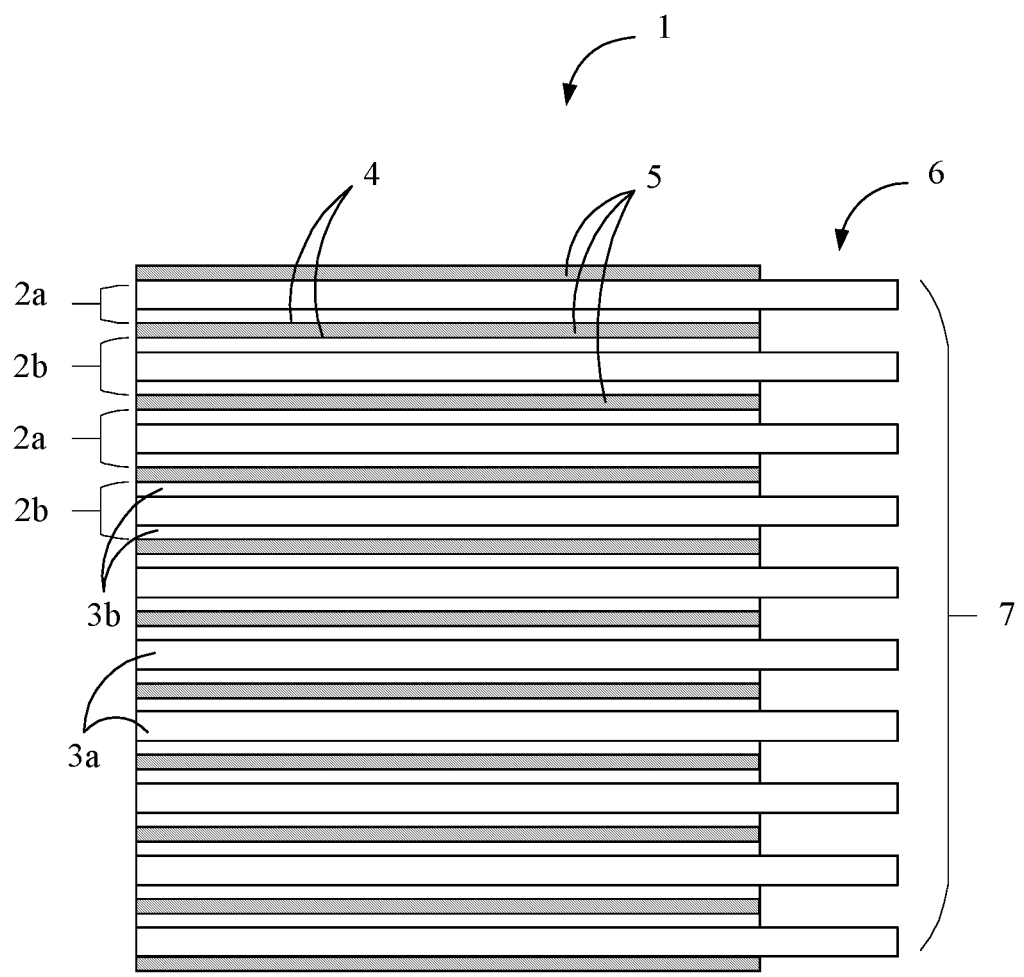
FIG. 1 is a cross-sectional view of a stack of electrodes.

FIG. 1 shows one such electrode stack 1, according to an embodiment, in a cross-sectional view. Electrode stack 1 comprises individual electrodes 2a and 2b that may include a combination of negative (anode) electrodes 2a and positive (cathode) electrodes 2b assembled one atop the other to form the stack 1. For example, electrodes 2a and 2b may be assembled in an alternating fashion atop one another but separated by dielectric layer 5.

Each electrode 2a and 2b comprises a conductive material layer 3a such as a metal foil. Optionally, the electrodes may also include a conductive coating 3b on one or both sides of conductive layer 3a thereby increasing the electrodes 2a or 2b relative thickness within stack 1. Each electrode 2a and 2b also includes a pair of opposite facing surfaces 4 that interface with dielectric layers 5 (e.g., the interface between conductive coating 3b and dielectric layer 5). Each conductive (e.g., metal foil) layer 3a includes a tab portion or tails 6 that extend from the main body of stack 1 such that tails 6 protrude from stack 1 out of one or more sides of stack 1. Tails 6 do not include dielectric layers 5 therebetween.

Typically, each electrode 2a and 2b in the electrode stack 1 has a portion that is intended to be substantially identical in location, length, width and thickness so that the individual tabs are aligned when the individual electrodes are stacked to form a metal foil layer stack 7. The stack 7 also includes tails 6, which are portions of the conductive material layers 3a that are not separated by dielectric layers 5 as described above, and which are intended to be pulled together as shown and described with respect to FIGS. 2-5 to form an anode or cathode.

The cross-sectional view of FIG. 1 shows that within the typical electrochemical cell, there may be both anode-type electrodes 2a and cathode-type electrodes 2b incorporated into a common stack 1.

The anode and cathode type electrodes 2a and 2b can be interdigitated (e.g., alternate) in embodiments, or a portion of the stack 1 (e.g., the upper portion relative to the stack direction) may be dedicated to electrodes of one polarity (e.g., anode-type electrode 2a) and a second portion of the stack 1 (e.g., the lower portion) may be dedicated to electrodes of the second polarity (e.g., cathode-type electrodes 2b), or may be incorporated in some combination thereof. The electrode stack 1 may also have additional separator layers or separators (not shown) appropriately placed between electrode layers, for example around the cathode material. The separator layers can be in the form of a sheet, wrap, bag or the like, in embodiments.

Figure 2:
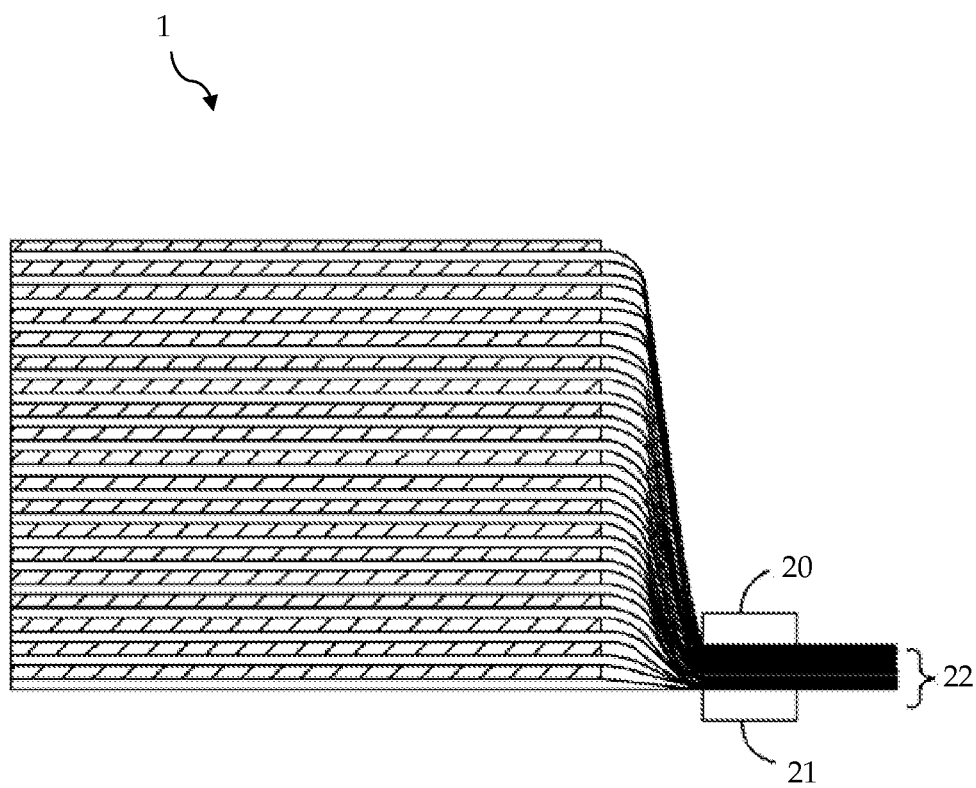
FIG. 2 is a cross-sectional view of the stack of electrodes of FIG. 1, wherein the tabs of the electrodes are gathered.

In some embodiments, the outermost electrodes in stack 1 may be an anode-type electrodes 2a or a cathode type electrode 2b containing a conductive coating 3b on one side of conductive material layer 3a. Such conductive coating 3b may be positioned on the side of conductive layer 3a facing toward the center of stack 1 as shown in FIG. 1. The outer sides of the outer most electrodes 2a or 2b may be covered by dielectric layer 5 to help electrically insulate and protect stack 1, Once the electrodes 2a and 2b are stacked, tails 6 of the metal foil layers are gathered together by pressing or compressing the tabs of the metal foil layers 3a together and then sandwiched between first end plate 20 and second end plate 21 as shown in FIG. 2 to form a compressed foil layer stack 22. After the end plates are pressed or compressed together to form the compressed metal foil layer stack 22, the extra foil extending beyond the end plates are trimmed flush to the edges of the end plates, the end plates 20 and 21 are welded to the compressed metal foil layer stack 22 and to one another. Once welded, the stacks are electrically conductive.

Figure 3:
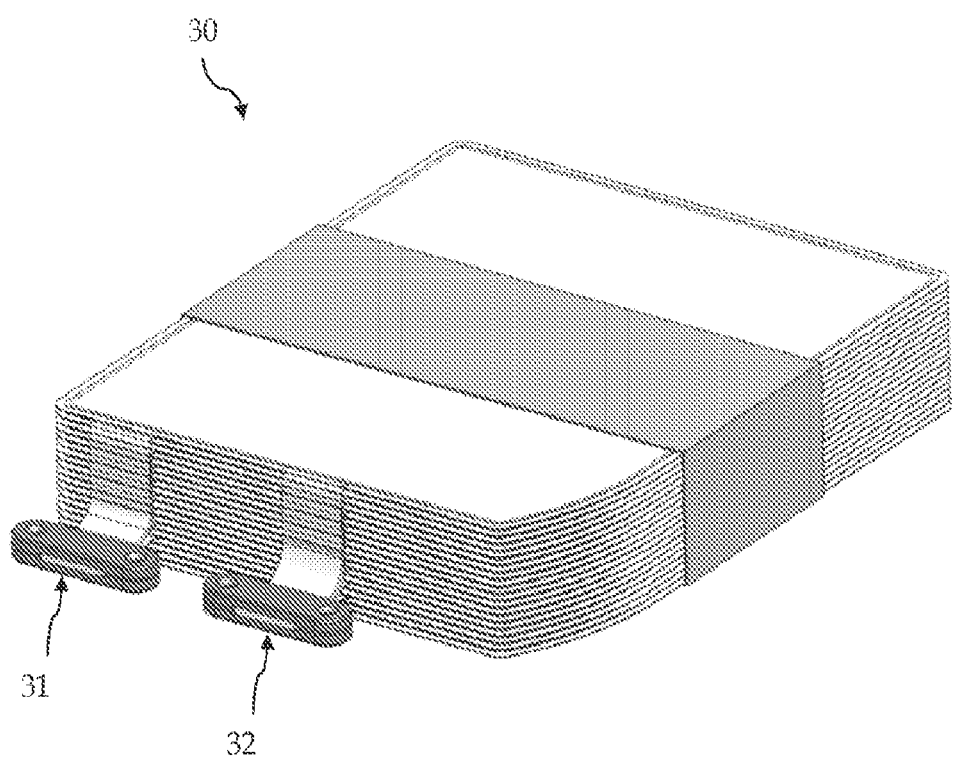
FIG. 3 is a perspective view of an electrochemical cell, according to an embodiment.

The cross-section shown in FIG. 2 is taken through the center of the metal foil layer stack 22. In embodiments, first end plate 20 and second end plate 21 can have various geometries that hold the metal foil layer stack 22 together. For example, as shown in FIG. 3, first end plate 20 and second end plate 21 can be shaped as halves of a bracket that includes a rectangular aperture. The effect of this design of first end plate 20 and second end plate 21 is to create a mortise aperture through which the metal foil layer stack 22 can pass, effectively forming a corresponding tenon. The dimensions of the 'mortise' aperture formed in the first and second end plates 20 and 21 can be set to correspond to an expected width, thickness, and number of foils that make up the metal foil layer stack 22.

The metal foil layers can be made from any electrically conductive and weld-able materials. Examples of such materials are copper, aluminum, nickel, titanium or alloys of or containing any of them. The thickness of the metal foil layers range from 5 micrometers to 40 micrometers, in other embodiments, from 10 micrometers to 20 micrometers. The range from 5 micrometers to 40 micrometers is intended to include any range or value within the range of 5 to 40 micrometers.

FIG. 3 is a perspective view of an electrochemical stack 30, according to an embodiment. As shown in FIG. 3, anode 31 and cathode 32 are each made up of a stack of foils as previously described with respect to FIG. 2. Anode 31 is electrically coupled to a first plurality of foils, while cathode 32 is electrically coupled to a second plurality of foils. While anode 31 and cathode 32 are illustrated as being collected on the same side of stack 30, in other examples the anode and cathode may be on different sides of stack 30.

Figure 4:
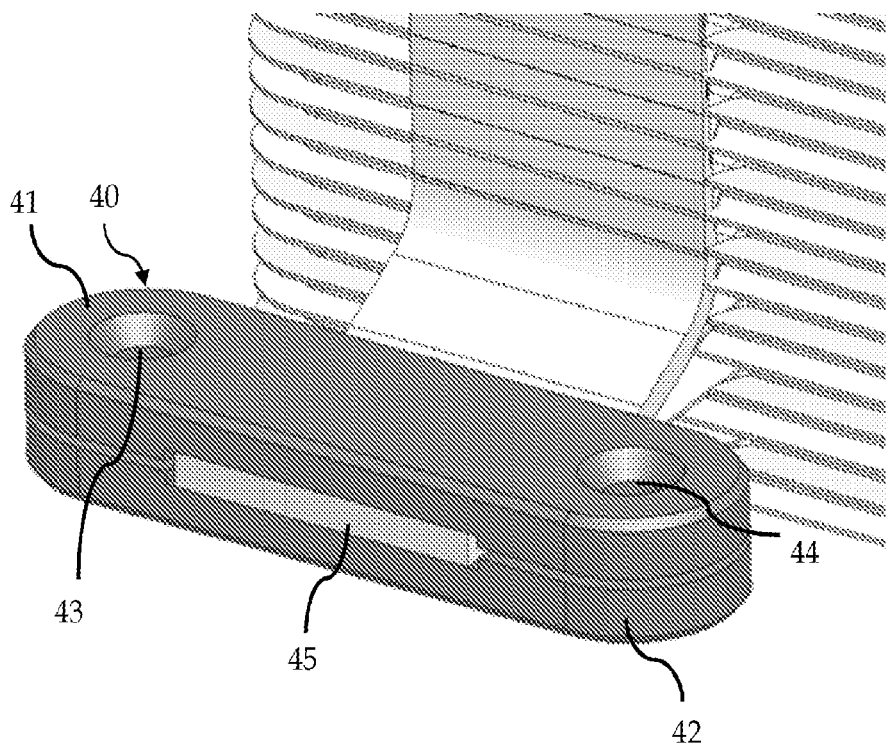
FIG. 4 is a detailed view of a gathered and welded metal foil stack of the electrochemical cell of FIG. 3.

Anode 31 and cathode 32 can be connected to a battery or other power source to charge the electrochemical stack 30, as described above, or stack 30 can be discharged to provide a desired power output such as a medical therapy. FIG. 4 shows a detailed view of an anode 40 including a first end plate 41, a second end plate 42, and interconnect apertures 43 and 44 which can be used for providing mechanical coupling to other structures that power or are powered by the corresponding electrochemical stack. As is evident from FIG. 4, coupling first end plate 41 to second end plate 42 around compressed tails 45 can provide an interference fit to compressively hold those tails 45 and facilitate electrical connection between the end plates (41, 42) and all of the tails (45).

Merely coupling first end plate 41 to second end plate 42 may not be sufficient, however, to prevent gaps between some of the tails 45, which can contribute to the failure modes described above. Accordingly, it can be desirable to form a weld joint that includes the tails 45 themselves, to prevent relative movement or delamination.

It has been discovered that the type of weldment or coupling between various parts of the anode 40 have different requirements. Specifically, it is important that the tails 45 be well connected to one another electrically to ensure electrical performance of the electrodes. Meanwhile, it is important that the end plates 41 and 42 be well connected to one another mechanically to prevent losing good interference fit to the tails 45 and to protect the joining between the tails and the end plates.

It has therefore been found that two separate types of weldment can be used to enhance both the electrical interconnection between the tails 45 and the mechanical connection between the end plates 41 and 42. In one embodiment, spot welds (Ti-Ti) can be used to couple the end plates 41 and 42 together. Meanwhile, an edge weld (e.g., Al—Ti) can be used to connect the tails 45 together, which promotes higher levels of electrically interconnection therebetween. It should be understood that the expression "Ti—Ti welds" herein can be welds between titanium or titanium alloys, in embodiments. Likewise, "Al—Ti" welds are formed between titanium and aluminum, or alloys of titanium and/or aluminum. "Ti" should include titanium alloys, for example Ti6Al4V (grade 5 titanium), Ti6Al4V ELI (grade 23 titanium), or Ti3Al2V (grade 9 titanium). Likewise, "Al" should include aluminum alloys such as 1N30, KS81 or 1235D.

Figure 5:
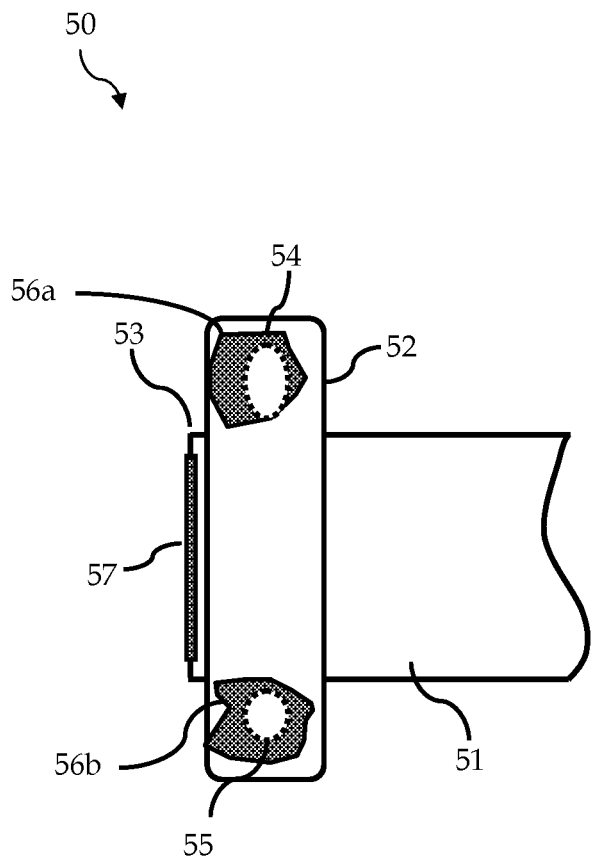
FIG. 5 is a simplified schematic plan view of a gathered and welded metal foil stack according to an embodiment.
Figure 6:
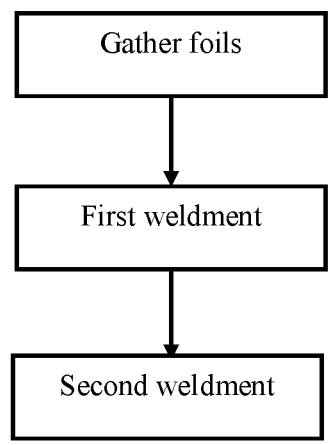
FIG. 6 is a flowchart of a method for forming a mechanical and electrical connection between the foils of an electrochemical cell, according to an embodiment.

FIG. 5 shows a schematic top view of a connector 50 (which could be an anode or cathode, for example) depicting two different weldments to accomplish enhanced electrical and mechanical connectivity between a plurality of tails 51 of an electrochemical stack. As shown in FIG. 5, the connector 50 includes the tails 51 and a clamping structure 52 that can be made up of two or more end plates as described with respect to FIGS. 2-4. Tails 51 form a through-tenon 53 that extends partially beyond the clamping structure 52.

Optional apertures 54, 55 are formed in connector 50, shown in dashed lines. The shape and size of the apertures 54 and 55 can vary based upon the connections to other components that either supply power to the connector 50 or receive power from the connector 50. For example, in FIG. 5 the first aperture 54 is oval-shaped and substantially larger than the smaller, rounder aperture 55. In some embodiments, no apertures 54, 55 are required whatsoever.

First weld, made up of two portions 56a and 56b in the drawing shown in FIG. 5, is formed at the clamping structure 52. First weld (56a and 56b) can be a penetration weld in one embodiment. A penetration weld is a weld that melts through the entire thickness of the welded part. In one such embodiment, a laser penetration welding process is used. Desirably, the top end plate has low electrical resistivity in order to provide adequate coupling of the laser energy. For example, a top end plate made of or comprising nickel could be used to weld a metal foil layer stack made from copper metal foil layers. The bottom plate may also have low electrical resistivity, but it is not required of the bottom end plate. Otherwise, the requirements of the bottom end plate are identical to the requirements of the top end plate. In alternative embodiments, a spot weld can be used at one or more locations to form the mechanical connection at the clamping structure.

As shown in FIG. 5, it has been found that it is beneficial for a portion of the first weld (56a and 56b) to be formed at a portion of the clamping structure 52 where the top portion is in direct contact with the bottom portion (i.e., where the tails 51 do not lie therebetween). By providing spot welds in such locations, it is possible to take advantage of the materials differences between the tails 51 and the clamping structure 52.

In one embodiment, for example, the tails 51 may be made of aluminum whereas the clamping structure 52 is made of two pieces (top and bottom, as shown above) that are each titanium or titanium alloys such as Ti6Al4V (grade 5 titanium), Ti6Al4V ELI (grade 23 titanium), and Ti3Al2V (grade 9 titanium). Because first weld (56a and 56b) extends over portions of clamping structure 52 that where the top and bottom portions of the clamping structure 52 are not separated by the tails 51, the connection is a Ti—Ti weld. The Ti—Ti weld at these portions provides some clamping force on the tails 51 that enhances electrical connection, but more importantly is a very strong mechanical connection that prevents relative displacement between the component parts of the connector 50.

Meanwhile, the second weld 57 is made on the exposed through tenon portion 53 of the tails 51, which are aluminum. In practice, tails 51 are trimmed to be flush to the edges of the end plate prior to making the second weld 57. Providing a separate Al—Ti weld at this location enhances the mechanical connection somewhat, but more importantly provides excellent electrical coupling between the tails 51.

As such, the two types of weld provide both mechanical strength (due to first weld 56a and 56b) that exceeds that of conventional systems as well as electrical connectivity (due to second weld 57) that exceeds that of conventional systems. Although Ti—Ti and Al—Ti welds are described herein, it should be understood that the materials of the foils, the connectors, and the weld material can be selected, in embodiments, to have desired characteristics for weld strength and electrical connectivity.

It should be understood that various aspects disclosed herein may be combined in different combinations than the combinations specifically presented in the description and accompanying drawings. It should also be understood that, depending on the example, certain acts or events of any of the processes or methods described herein may be performed in a different sequence, may be added, merged, or left out altogether (e.g., all described acts or events may not be necessary to carry out the techniques). In addition, while certain aspects of this disclosure are described as being performed by a single module or unit for purposes of clarity, it should be understood that the techniques of this disclosure may be performed by a combination of units or modules associated with, for example, a medical device.

What is claimed is:

1. An electrochemical cell comprising:
    a stack including a plurality of foils;
    a plurality of tails, each one of the plurality of tails corresponding to one of the plurality of foils;
    a connector having a first end plate and a second end plate and defining a gap therebetween, wherein the plurality of tails are arranged to pass through the gap to form a through tenon;
    a first weldment having a first weld type mechanically coupling the first end plate to the second end plate;
    a second weldment having a second weld type different than the first weld type, mechanically and electrically coupling the plurality of foils at the plurality of tails.

2. The electrochemical cell of claim 1, wherein the connector defines at least one interconnection aperture.

3. The electrochemical cell of claim 2, wherein the at least one interconnection aperture includes a plurality of interconnection apertures.

4. The electrochemical cell of claim 3, wherein the plurality of interconnection apertures include apertures having different sizes from one another.

5. The electrochemical cell of claim 1, wherein the plurality of foils and the plurality of tails thereof comprise aluminum.

6. The electrochemical cell of claim 1, wherein the first weldment is a Ti—Ti weld and the second weldment is a Ti—Al weld.

7. The electrochemical cell of claim 1, wherein the stack includes both an anode and a cathode, and the coupler corresponds to one of the anode or the cathode.

8. The electrochemical cell of claim 7, further comprising a second connector corresponding to the other of the anode or the cathode.

9. The electrochemical cell of claim 1, wherein the plurality of foils are separated from one another at the stack portion of the electrochemical cell by a dielectric material.

10. An anode or cathode structure of an electrochemical cell, the anode or cathode structure comprising:
    a connector having a first end plate and a second end plate and defining a mortise therebetween;
    a plurality of foils forming a tenon that passes through the mortise defined by the connector from a first end to a second end;
    a first weldment having a first weld type mechanically coupling the first end plate to the second end plate;
    a second weldment having a second weld type different than the first weld type, mechanically and electrically coupling the plurality of foils at one of the first end or the second end.

11. The anode or cathode structure of claim 10, wherein the connector defines at least one interconnection aperture.

12. The anode or cathode structure of claim 11, wherein the at least one interconnection aperture comprises a plurality of apertures.

13. The anode or cathode structure of claim 12, wherein the plurality of apertures includes apertures with different sizes from one another.

14. The anode or cathode structure of claim 10, wherein the plurality of foils comprise aluminum or aluminum alloy.

15. The anode or cathode structure of claim 10, wherein the first weldment is a Ti—Ti weld and the second weldment is a Ti—Al weld.

16. A method of forming a welded metal foil stack of an electrochemical cell, the method comprising:
    gathering a plurality of foils in a mortise between a first end plate and a second end plate of a connector;
    mechanically coupling the first end plate to the second end plate of the connector with a first weldment having a first weld type; and mechanically and electrically coupling the plurality of foils with a second weldment having a second weld type different than the first weld type.

17. The method of claim 16, wherein the first weld type is a penetration weld.

18. The method of claim 16, wherein the first weld type is a spot weld.

19. The method of claim 16, wherein the plurality of foils comprise aluminum.

20. The method of claim 16, wherein the first weldment is a Ti—Ti weld and the second weldment is a Ti—Al weld.

* * * * *